US 8,885,764 B2

(12) United States Patent
Baldemair et al.

(10) Patent No.: US 8,885,764 B2
(45) Date of Patent: Nov. 11, 2014

(54) EVM POOLING FOR MULTI-STANDARD AND MULTI-CARRIER SYSTEMS

(75) Inventors: Robert Baldemair, Solna (SE); Ali Behravan, Stockholm (SE); Farshid Ghasemzadeh, Sollentuna (SE); Daniel Larsson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 201 days.

(21) Appl. No.: 13/501,333

(22) PCT Filed: May 3, 2010

(86) PCT No.: PCT/SE2010/050482
§ 371 (c)(1),
(2), (4) Date: Apr. 11, 2012

(87) PCT Pub. No.: WO2011/046487
PCT Pub. Date: Apr. 21, 2011

(65) Prior Publication Data
US 2012/0195395 A1  Aug. 2, 2012

Related U.S. Application Data

(60) Provisional application No. 61/252,025, filed on Oct. 15, 2009.

(51) Int. Cl.
*H04K 1/10* (2006.01)
*H04L 27/26* (2006.01)

(52) U.S. Cl.
CPC ............................ *H04L 27/2618* (2013.01)
USPC ........... 375/296; 375/295; 375/219; 375/260; 375/259; 370/233

(58) Field of Classification Search
USPC ........... 375/296, 295, 219, 260, 259; 370/233
See application file for complete search history.

(56) References Cited

U.S. PATENT DOCUMENTS

| 2008/0101502 A1* | 5/2008 | Navidpour et al. ........... 375/296 |
| 2008/0137767 A1* | 6/2008 | Jaenecke ....................... 375/267 |
| 2010/0150256 A1* | 6/2010 | Morris et al. ................. 375/260 |

OTHER PUBLICATIONS

Aggarwal, A. et al. "Globally Optimal Tradeoff Curves for OFDM Par Reduction." IEEE Workshop on Signal Processing Systems, Oct. 13-15, 2004, pp. 12-17.
Jiang, Y. et al. "Adaptive Weight Peak-Cancelling Scheme for OFDM Systems." The 18th Annual IEEE Symposium on Personal, Indoor an Mobile Radio Communications (PIMROC'07), Athens, Greece, Sep. 3-7, 2007, pp. 1-6.

* cited by examiner

*Primary Examiner* — Zewdu Kassa
(74) *Attorney, Agent, or Firm* — Murphy, Bilak & Homiller, PLLC (57) ABSTRACT

Error vector magnitude (EVM) is pooled and adaptively distributed among carriers in a multi-standard or multi-carrier system to reduce peak to average power ratios (PAPR) without exceeding EVM limits. Correction tone injection is used to reduce PAPR. The amplitude of each correction tone, and number of correction tones assigned to a carrier, are adjusted to control the EVM and out-of-band distortion of each carrier, to comply with EVM limits imposed by the respective radio access technology.

26 Claims, 6 Drawing Sheets

EVM POOLING FOR MULTI-STANDARD AND MULTI-CARRIER SYSTEMS

FIELD OF INVENTION

The present invention relates generally to wireless communications, and in particular to a system and method for adaptively allocating EVM among different carriers in a multi-standard or multi-carrier system to reduce peak to average power ratio without exceeding EVM limits.

BACKGROUND

Figure 8:
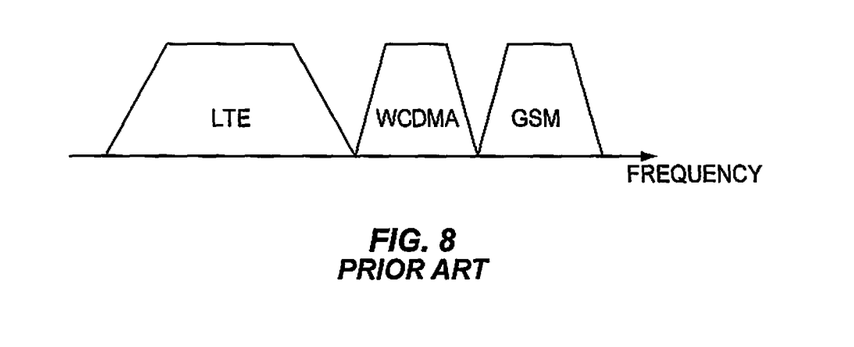
FIG. 8 is a representative spectrum diagram of a prior art multi-standard wireless communication system.

Wireless communication systems are ubiquitous in many parts of the world. Several different Radio Access Technologies (RAT) have been deployed (e.g., WCDMA, GSM, LTE), and often different RATs cover the same geographic area(s). As users demand services and capabilities requiring higher bandwidth and interoperability, multi-standard systems, featuring simultaneous operation in two or more RATs, are being developed and deployed. FIG. 8 depicts a representative spectrum of a multi-standard radio system where the signals from different baseband sections are multiplexed together and sent through the same radio. In particular, consider a 10 MHZ LTE signal and a 5 MHZ WCDMA signal. The two signals can first be multiplexed and arranged next to each other in frequency, and the combined signal is then sent through the same radio. This concept can be extended to include additional baseband signals, and additional standards, such as GSM (as depicted in FIG. 8).

Figure 9:
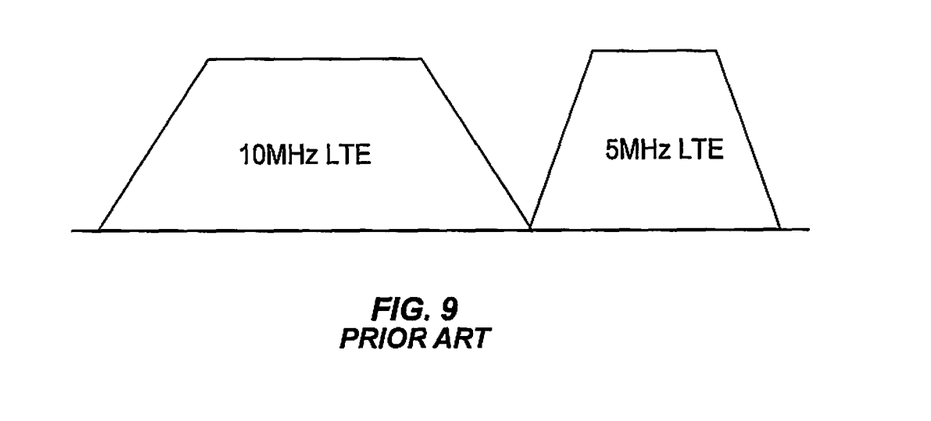
FIG. 9 is a representative spectrum diagram of a prior art wireless communication system employing two different carriers within the same standard.

FIG. 9 depicts another approach to increased bandwidth—multi-carrier operation within a RAT. In this case, signals are modulated onto multiple carriers, using the same protocol. For example, FIG. 9 depicts the simultaneous transmission of 10 MHz and 5 MHz LTE signals. As used herein, a system with multiple carriers using the same standard (such as FIG. 9) is considered a special case of multi-standard system.

Amplifying circuits, including those in radio transceivers, are designed with a particular dynamic range. That is, the amplifier can faithfully reproduce signal variations within predetermined limits. Designing amplifiers with very large dynamic range is challenging, and adds costs and complexity to a system. However, the large dynamic range may be relatively rarely utilized, as signal peaks may be rare, compared to average signal values. A factor that reflects the prevalence of high signal peaks, as compared to average values, is the Peak to Average Power Ratio (PAPR), also known in the art as the crest factor. The PAPR may be formulated as $$C = \frac{|x|_{peak}}{x_{rms}},$$

where
$|x|_{peak}$ is the magnitude of a (positive or negative) peak value of a signal x, and $x_{rms}$ is the root mean square value of the signal. The PAPR is a dimensionless quantity, often expressed as dB. Each wireless communication protocol has characteristic PAPR limits required for reliable communication, which arise from the employed modulation scheme (e.g., QPSK=3.5-4 dB; 64QAM=7.7 dB; 128QAM=8.2 dB).

In multi-standard system, due to the aggregation of signals from different standards (and different modulation techniques), the problem of high PAPR is generally more pronounced than in the case of a single-standard system (with only one carrier). A high PAPR causes either non-efficient use of high power amplifiers in system transceivers, or high non-linearity distortion in the transmitted signal. A common remedy is to limit the peak of the signal to achieve acceptable power efficiency. This causes distortion, both in-band and out-of-band. The in-band distortion is referred to as the error vector magnitude (EVM), which must be limited to a pre-defined value according to standards.

Among methods to reduce PAPR, the easiest ones in terms of implementation are methods that are transparent to the receiver. That is, the receiver does not need to know the method that is used in the transmitter, and no side channel is needed between the transmitter and the receiver. The simplest, and the most commonly used, transparent PAPR-reduction method is clipping the signal in the baseband section. Amplitude clipping limits the peak envelope of the signal to a predetermined value, but otherwise passes the signal through unperturbed. Clipping adds distortion, and introduces spurious signal harmonics. While the harmonics can be reduced by filtering the signal after clipping, the filtering may cause some peak re-growth, so that the signal again exceeds the clipping limit. Iteratively clipping and filtering the signal may minimize the induced noise, but at the cost of computational complexity and signal delay.

Tone injection is also commonly used to reduce PAPR. In tone injection, sine waves at specific frequencies (tones) are added as distortion on the top of the transmitted signal. Tone injection increases the modulation constellation size so that each of the points in the original basic constellation can be mapped into several equivalent points in the expanded constellation. Since each symbol in a data block can be mapped into one of several equivalent constellation points, these extra degrees of freedom can be exploited for PAPR reduction. This method is called tone injection because substituting a point in the basic constellation for a new point in the larger constellation is equivalent to injecting a tone of the appropriate frequency and phase in the multicarrier signal. See, for example, S. H. Han and J. H. Lee, "An overview of peak-to-average power ratio reduction techniques for multicarrier transmission," *IEEE Wireless Communication Magazine*, vol. 12, pp. 56-65, April 2005, the disclosure of which is incorporated herein by reference in its entirety.

In a multi-standard system, different RATs have different requirements regarding the tolerated EVM and out-of-band radiation. Also in different power scenarios, constituent RATs may have different power spectral densities (PSD). When an aggregate, multi-standard signal is clipped for PAPR reduction, the resulting EVM and/or spectral mask of some of the RATs might be violated, while the others may not only tolerate the distortion, but could operate acceptably with even greater distortion. Also, in the case of OFDM-based RATs, within each carrier's bandwidth there might be uneven EVM or PSD requirements. This can be either due to different modulation schemes per subcarrier or boosting and deboosting of certain subcarriers. The EVM values for the constituent signals, resulting from conventional PAPR-reduction algorithms, are not adaptable and can not be weighted arbitrarily across different RATs.

SUMMARY

According to embodiments disclosed herein, EVM is pooled and adaptively distributed among carriers in a multi-standard or multi-carrier system to reduce PAPR without exceeding EVM limits. Selective tone injection is used to reduce PAPR, and the amplitude of each tone and number of tones assigned to a carrier are adjusted to control the EVM and out-of-band distortion of each carrier to comply with EVM limits imposed by the respective RAT.

One embodiment relates to a method, performed in a wireless communication transmitter, of reducing the peak to average power ratio (PAPR) in an aggregate wireless communication signal comprising two or more constituent signals, each modulated onto a carrier, while controlling the error vector magnitude (EVM) of each constituent signal. Groups of correction tones are adaptively allocated to each constituent signal in response to one of an EVM limit associated with one or more of the signals and a desired signal amplitude. The correction tones are injected into the aggregate signal so as to reduce the PAPR of the aggregate signal while complying with the EVM limits of the constituent signals.

Another embodiment relates to a transmitter operative to transmit an aggregate wireless communication signal comprising a plurality of constituent signals, each modulated onto a carrier. The transmitter includes a plurality of sampling modules, each operative to upsample a constituent signal to a common sampling rate. The transmitter further includes a combining module operative to combine the constituent signals into the aggregate signal. The transmitter also includes an adaptive tone injection module operative to adaptively allocate groups of correction tones to each constituent signal in response to an EVM limit associated with the respective signal. The adaptive tone injection module is further operative to inject the correction tones into the aggregate signal so as to reduce the PAPR of the aggregate signal while complying with the EVM limits of the constituent signals.

DETAILED DESCRIPTION

To explain the inventive methodology of selective tone injection to reduce aggregate PAPR while respecting EVM limits, an arbitrary signal s[n] is considered, and the mathematics of tone injection is analyzed. Consider an arbitrary signal s[n], which can be a single modulated signal or a combination of differently modulated signals. Tone-injection or tone-reservation can be used to reduce the PAPR to a predefined level L.

Consider a tone as $D_k \exp(j2\pi f_k t + \phi_k)$ within the limited time interval $0 \leq t \leq T$, where $D_k$ is the amplitude of the tone, $f_k$ is the frequency of the tone, and $\phi_k$ is the phase (or phase shift) of the tone. Since most of the operations are done in a discrete-time baseband signal, without loss of generality, we consider the sampled signal, $$D_k \exp\left(j\frac{2\pi nk}{N} + \varphi_k\right) \qquad (1)$$

where n is the index in the discrete time domain and k is the index in the discrete frequency domain, which is also referred to as the tone index.

Assume M constituent signals, each with a different EVM limit, $$EVM_m \leq EVM_m^{(limit)}; m=0,1,\ldots,M-1 \qquad (2)$$

where m refers to different carriers or different frequency bins. That is, the EVM of each constituent signal is maintained at or below a predetermined EVM limit for that signal. The RATs operating at the different carriers can be the same, or different.

On the other hand, the EVM of the combined signal should be below a limit dependent on the clip level imposed to achieve a required PAPR:

$$\sqrt{\frac{1}{M}\sum_{m=0}^{M-1} a_m EVA_m^2} = EVM_{rms} \leq f(L) \qquad (3)$$

where f is the function relating the clip level L to the $EVM_{rms}$ of the aggregated signal, and $a_m$ is a constant depending on the bandwidth and power of each signal.

Note that since, in EVM pooling, the relative EVM of different signals is important rather than their absolute value, $EVM_{rms}$ can be any constant (for example unity), and all values can be scaled according to the PAPR of the combined signal.

Figure 1A:
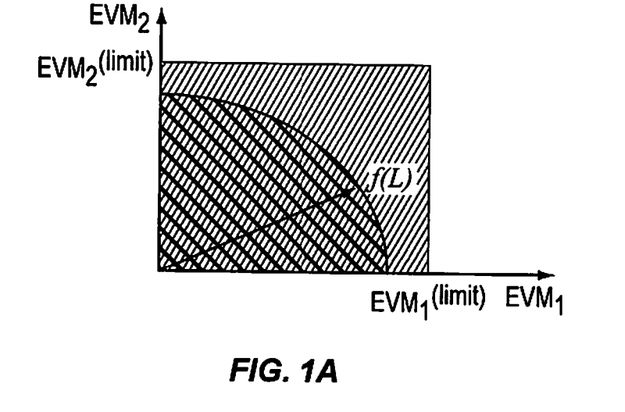
FIGS. 1A-1C are graphs depicting the relative PAPR and EVM limits of a representative aggregate signal comprising two constituent signals.
Figure 1B:
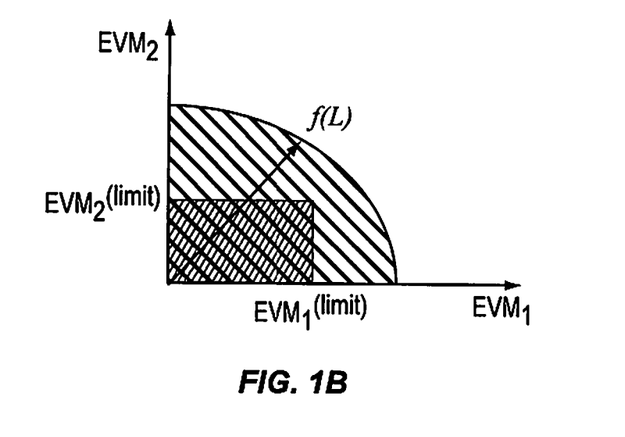
Figure 1C:
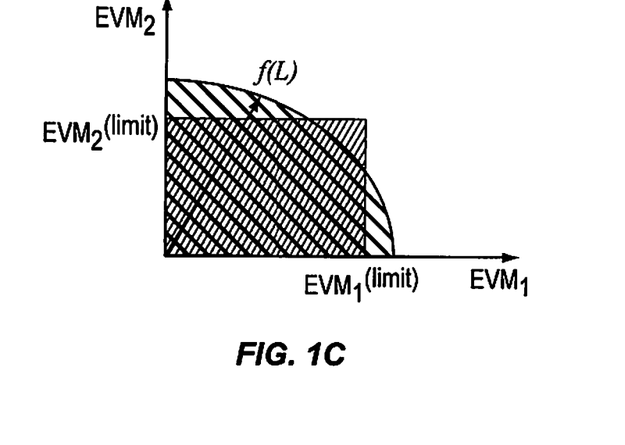

The relation between the requirements on EVM and the maximum signal amplitude level L is explored, for different scenarios, in FIG. 1, which depicts graphs of three different such scenarios for two constituent baseband signals. The two signals may represent signals in a multi-standard system (i.e., in different RATs), or signals modulated onto two carriers in the same RAT. Three cases employing the limits of equations (2) and (3) are depicted, and the shaded areas represent one of the limits of equations (2) and (3).

In particular, FIG. 1a depicts that case that both signals have EVM budget to spare. That is, the PAPR limit f(L) of the combined signal is more strict than the EVM requirement placed on either constituent signal ($EVM_1^{(limit)}$ or $EVM_2^{(limit)}$). This case is PAPR-constrained.

Conversely, FIG. 1b depicts the case that both signals have too low EVM budget to achieve the desired peak level. That is, the PAPR limit f(L) of the combined signal exceeds the EVM requirement placed on each constituent signal ($EVM_1^{(limit)}$ and $EVM_2^{(limit)}$). This case is EVM-constrained.

Finally, FIG. 1c depicts that case where both the EVM and PAPR limits impose constraints.

According to one embodiment, using EVM pooling, the EVM budget for one carrier can be used up to its maximum (depending on the constraints in the problem), so that the carrier with less tolerance for EVM can have less or even zero EVM. This can be applied as long as the instantaneous signal magnitude criterion for PAPR, $|s[n]| \leq L$, holds.

To implement EVM pooling, we first define a tone amplitude vector with K equally spaced sub-bands in the frequency domain, grouped in M clusters of size $\{q_0, q_1, \ldots, q_{M-1}\}$, $$D = \underbrace{\{\underbrace{D_0, D_0, \ldots, D_0}_{q_0}, \underbrace{D_1, D_1, \ldots, D_1}_{q_1}, \ldots, \underbrace{D_{M-1}, D_{M-1}, \ldots, D_{M-1}}_{q_{M-1}}\}}_{K} \quad (4)$$

To assign different EVM per constituent signal, M can be set to the number of the baseband signals, with the size of each cluster, $q_m$, equal to the number of frequency bins within the bandwidth allocated by the corresponding carrier. Alternatively, $q_m$ can also be wider than the carrier. The M signals may be in different RATs, or M different carriers in the same RAT.

Figure 2:
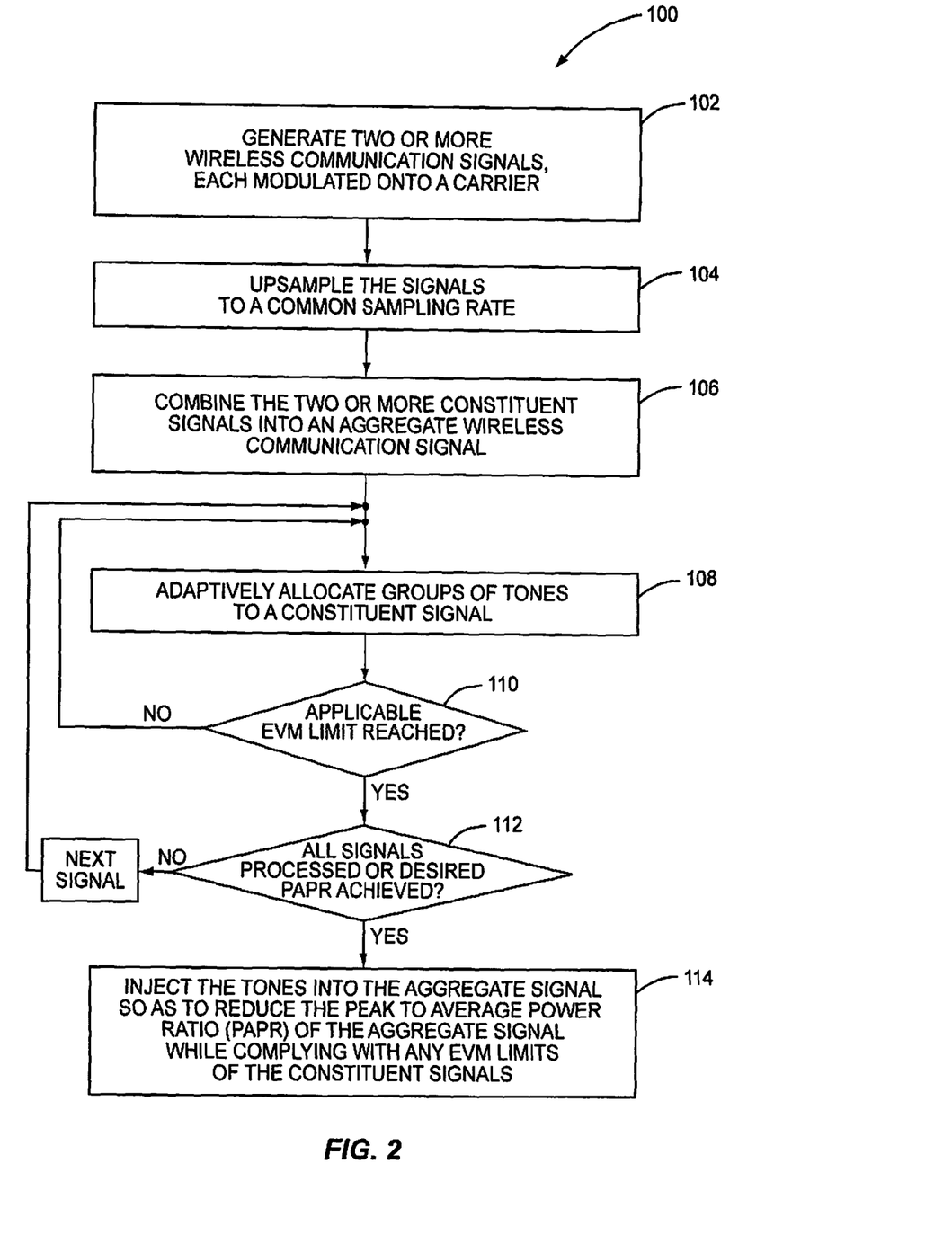
FIG. 2 is a flow diagram of a method of reducing the PAPR of an aggregate signal while controlling the EVM of each constituent signal.
Figure 3:
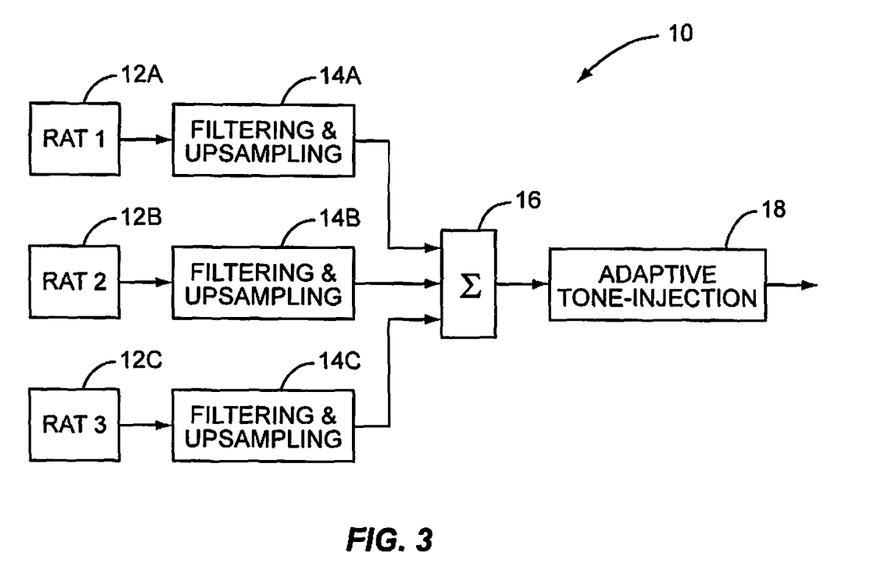
FIG. 3 is a functional block diagram of a transmitter aggregating signals from three RATs and applying adaptive tone injection to allocate EVM among the signals.

A method 100 of reducing the PAPR of an aggregate wireless communication signal comprising two or more constituent signals, while controlling any EVM of constituent signals, is depicted in FIG. 2, and explained with reference to both FIGS. 2 and 3. FIG. 3 depicts a representative transmitter 10 implementing the method 100, where the number of carriers M=3. The baseband signals from different RATs (or alternatively, different carriers within the same RAT), one or more of which may have an EVM limit, are generated (block 102) in signal generators 12A, 12B, 12C. The signals are up-sampled to a common sampling rate (block 104) in filtering and upsampling modules 14A, 14B, 14C, respectively. The signals are then combined (block 106) in a signal combining module 16.

Correction tones are adaptively allocated to each constituent signal, in accordance with any EVM limit on the signal, as necessary to reduce overall PAPR of the aggregate signal (blocks 108, 110). When all of the constituent signals have been thus processed (i.e., correction tones allocated) (blocks 112, 114), the correction tones are injected into the aggregate signal in adaptive tone-injection module 18. The tones increase the average power of the aggregate signal, thus reducing the PAPR, while respecting any EVM limits of the constituent signals. Specific embodiments of the adaptive tone-injection function 18 are described in greater detail below.

As those of skill in the art will readily appreciate, the signal generation 12A, 12B, 12C; filtering and upsampling 14A, 14B, 14B; combining 16; and adaptive tone injection 18 modules may each comprise dedicated hardware, such as one or more ASICs; programmed logic, such as one or more FPGAs; software modules executing on a stored-program controller such as a DSP or microprocessor; or any combination thereof.

Figure 4:
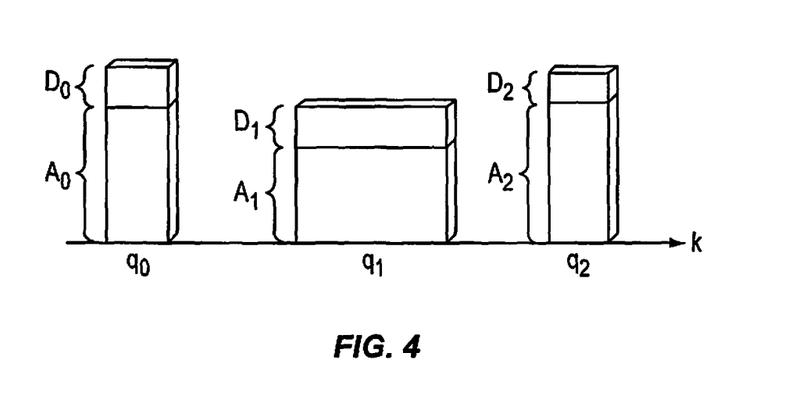
FIG. 4 is a graph depicting power and bandwidth of three signals, and the power component added by adaptive tone injection.

FIG. 4 depicts an example of assigning the amplitude of the tones for EVM pooling in a system with M=3 constituent signals having different power and bandwidth. In this figure, A is the (average) amplitude of the constituent signals, and D represents the injected tones.

Two scenarios are considered regarding the power per standard. In the case of equal power, $q_0 A_0^2 = q_1 A_1^2 = \ldots$ and therefore $$EVM_{rms} = \sqrt{\frac{\sum_{m=0}^{M-1} q_m D_m^2}{\sum_{m=0}^{M-1} q_m A_m^2}} = \sqrt{\frac{1}{M} \sum_{m=0}^{M-1} EVM_m^2}. \quad (5)$$

where $EVM_{rms}$ is the combined signal EVM, which can be seen as a constant scaling. As one example, for even EVM distribution, $$EVM_m = EVM_{rms} \Rightarrow D_m = EVM_{rms} \cdot A_m$$

In the case of equal power spectral density (PSD), $A_0 = A_1 = \ldots$ and therefore $$EVM_{rms} = \sqrt{\frac{\sum_{m=0}^{M-1} q_m D_m^2}{\sum_{m=0}^{M-1} q_m A_m^2}} = \sqrt{\frac{\sum_{m=0}^{M-1} q_m D^2}{A^2 \sum_{m=0}^{M-1} q_m}} = \sqrt{\frac{\sum_{m=0}^{M-1} q_m EVM_m^2}{K}}. \quad (6)$$

As one example, for even EVM distribution, $$EVM_m = \frac{EVM_{rms}}{\sqrt{\frac{1}{K} \sum_{m=0}^{M-1} q_m}} = EVM_{rms} \Rightarrow D_m = EVM_{rms} \cdot A_m$$

In case of OFDM signals, the EVM can even be assigned at a subcarrier level simply by setting $D_k = EVM_k \cdot A_k$, while in case of other signals such as WCDMA, there is no direct translation between the EVM of the carrier and the symbol EVM.

According to embodiments of the present invention, PAPR reduction is achieved by distribution of the EVM among constituent carriers in a multi-standard system, by tone allocation. The adaptive distribution of EVM can be among different carriers and/or within the bandwidth of each carrier. As discussed above, a system with multiple carriers using the same standard is considered a special case of multi-standard system.

Figure 5:
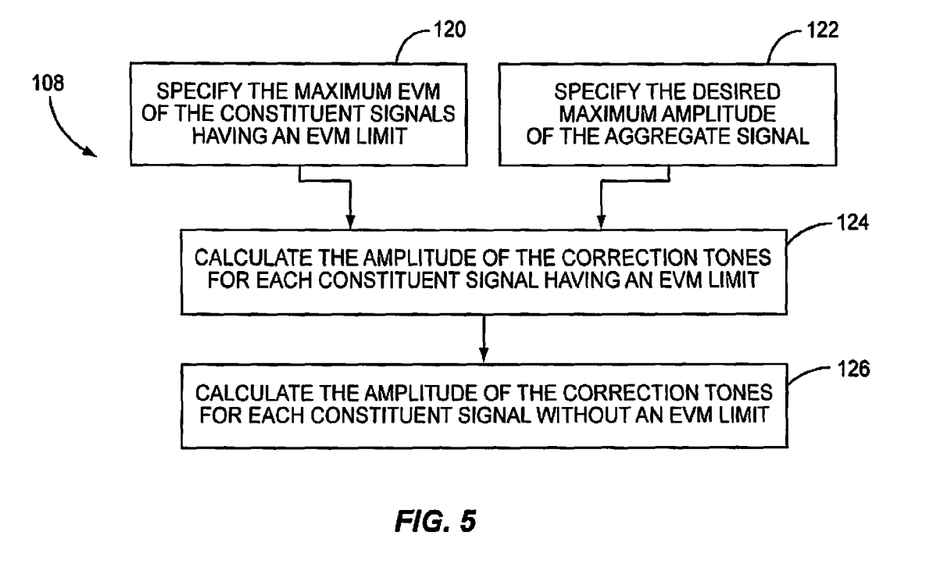
FIG. 5 is a flow diagram of a first embodiment of allocating correction tones to constituent signals (FIG. 2, block 108).

In a first embodiment, the adaptive allocation of correction tones to each constituent signal (FIG. 2, block 108) by the adaptive tone-injection module 18 operates as depicted in FIG. 5. In this embodiment, one or several constituent carriers have an associated EVM limit, and the goal is to achieve as low an amplitude level as possible. In this embodiment, the correction signal is calculated such that the EVM of those carriers having an EVM budget is used, up to the maximum allowed value. The maximum EVM of the carriers with an EVM limit is specified (block 120), and the desired maximum amplitude of the aggregate signal is also specified (block 122). The amplitude of correction tones for each constituent signal having an EVM limit is calculated (block 124), and then the amplitude of correction tones for the constituent signals without any EVM limit is calculated to load these signals just enough to reach the required amplitude clip level (block 126). In the context of FIG. 1, this first embodiment corresponds to there being a hard limit on at least one of the sides of the rectangle, but the EVM of the remaining carriers are used just enough to lower the amplitude of the aggregate signal to the target level, which is specified by the arc f(L).

Figure 6:
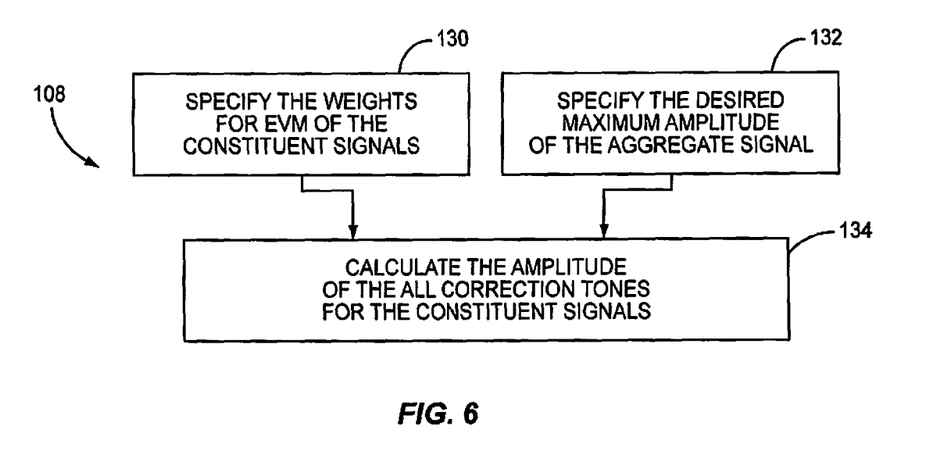
FIG. 6 is a flow diagram of a second embodiment of allocating correction tones to constituent signals (FIG. 2, block 108).

In a second embodiment, the target amplitude of the aggregate signal is known, but there is no limit on the EVM, except the relative amount of EVM to be assigned to the constituent carriers. In this embodiment, different weights are assigned to the EVM of different carriers, as depicted in FIG. 6. The adaptive tone-injection module 18 specifies weights for the EVM of different constituent signals (block 130), and the desired maximum amplitude of the aggregate signal is also specified (block 132). The amplitude of correction tones for each constituent signal is then calculated (block 124). In the context of FIG. 1, this second embodiment corresponds to only the ratio between the sides of the rectangle being specified, with no absolute value for $EVM^{(limit)}$ being set. The diagonal of the rectangle is specified by the arc of an ellipse, f(L).

Figure 7:
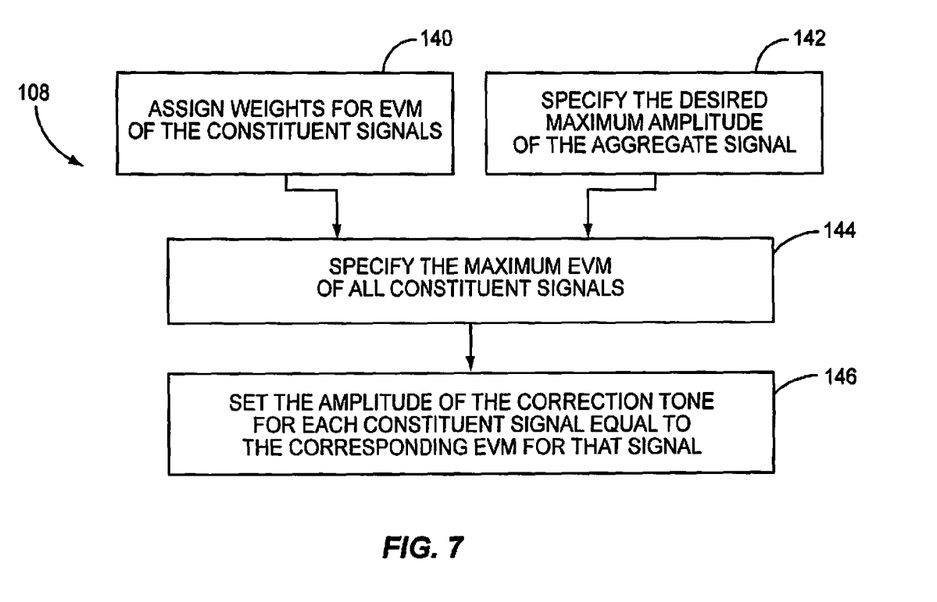
FIG. 7 is a flow diagram of a third embodiment of allocating correction tones to constituent signals (FIG. 2, block 108).

In a third embodiment, all of the constituent carriers have an associated EVM limit, and the goal is to achieve an amplitude of the aggregate signal as low as possible. In this case, as depicted in FIG. 7, the adaptive tone-injection module 18 assigns weights for the EVM of constituent signals (block 140), and specifies the desired maximum amplitude of the aggregate signal (block 142). The maximum EVM of all constituent signals is then specified (block 144), and the amplitude of the correction tone for each constituent signal sis set equal to the corresponding EVM for that signal (block 146). In this manner, the correction signal is calculated such that the EVM of carriers is used, up to the maximum allowed value. In the context of FIG. 1, this corresponds to operating at the corner of the rectangle that is diagonally opposite to the origin, and the arc of ellipse specified by f(L) must be disregarded.

According to embodiments of the present invention, in a multi-standard (or multi-carrier) system, PAPR is reduced, and the amount of resulting EVM and/or out-of-band distortion that each RAT experiences can be controlled. This is important since different RATs have different EVM and spectral mask requirements. Also, different power levels on different signals result in uncontrolled EVM distribution. Using EVM pooling, a standard that is more tolerant to distortion can bear correction signals (tones) with higher amplitude, while the other carriers will have lower amplitude corrections. Also, using EVM pooling, correction signals with higher power are assigned to carriers or subcarriers with higher power, to meet the EVM and the PAPR. Additionally, in case of OFDM signals, the allocation of EVM among subcarriers can vary such that for example those subcarriers with lower modulation constellation size can be assigned higher EVM, while the subcarriers with higher constellation size are assigned lower EVM.

The present invention may, of course, be carried out in other ways than those specifically set forth herein without departing from essential characteristics of the invention. The present embodiments are to be considered in all respects as illustrative and not restrictive.

The invention claimed is:

1. A method, in a wireless communication transmitter, of reducing the peak to average power ratio (PAPR) of an aggregate wireless communication signal comprising two or more constituent signals, each modulated onto a carrier, while controlling the error vector magnitude (EVM) of each constituent signal, the method comprising:
   adaptively allocating groups of correction tones to each constituent signal in response to an EVM limit associated with one or more of the signals or a desired signal amplitude, or both; and
   injecting the correction tones into the aggregate signal so as to reduce the PAPR of the aggregate signal while complying with the EVM limits of the constituent signals.

2. The method of claim 1, wherein allocating groups of correction tones to each constituent signal comprises:
   specifying the maximum EVM of the constituent signals having an EVM limit;
   specifying the desired maximum amplitude of the aggregate signal;
   calculating the amplitude of the correction tones for each constituent signal having an EVM limit; and
   calculating the amplitude of the correction tones for each constituent signal without an EVM limit.

3. The method of claim 1, wherein allocating groups of correction tones to each constituent signal comprises:
   specifying the weights for EVM of the constituent signals;
   specifying the desired maximum amplitude of the aggregate signal; and
   calculating the amplitude of the all correction tones for the constituent signals.

4. The method of claim 1, wherein allocating groups of correction tones to each constituent signal comprises:
   assigning weights for EVM of the constituent signals;
   specifying the desired maximum amplitude of the aggregate signal;
   specifying the maximum EVM of all constituent signals; and
   setting the amplitudes of the correction tones for each constituent signal so that the EVM for each constituent signal is equal to the corresponding maximum EVM for that signal.

5. The method of claim 1, wherein adaptively allocating groups of correction tones to each constituent signal comprises allocating higher amplitude correction tones to a carrier having a higher EVM limit.

6. The method of claim 1, wherein adaptively allocating groups of correction tones to each constituent signal comprises allocating correction tones having higher aggregate power to a carrier having a higher average power.

7. The method of claim 1, wherein the constituent signals conform to two or more radio access technologies.

8. The method of claim 1, wherein the constituent signals are modulated onto different carriers in the same radio access technology.

9. The method of claim 1, wherein two or more constituent carriers are orthogonal frequency division multiplexed (OFDM), the method further comprising allocating correction tones such that subcarriers with higher tolerance for EVM exhibit a higher EVM.

10. The method of claim 9, wherein subcarriers with higher tolerance for EVM comprise subcarriers with a lower modulation constellation size.

11. The method of claim 1, wherein the correction tones form a tone amplitude vector with K equally spaced subbands in frequency domain, grouped in M clusters of size $\{q_0, q_1, \ldots, q_{M-1}\}$, $$D = \{\underbrace{D_0, D_0, \ldots D_0}_{q_0}, \underbrace{D_1, D_1, \ldots D_1}_{q_1}, \ldots, \underbrace{D_{M-1}, D_{M-1}, \ldots D_{M-1}}_{q_{M-1}}\}$$

where M is the number of constituent signals, and the size of each cluster, $q_m$, is at least equal to the number of frequency bins within the bandwidth allocated by the corresponding constituent signal.

12. The method of claim 11, wherein A is the amplitude of a constituent signal, and wherein the constituent signals have equal power, $q_0 A_0^2 = q_1 A_1^2 = \ldots$ the aggregate signal EVM, denoted $EVM_{rms}$, is $$EVM_{rms} = \sqrt{\frac{\sum_{m=0}^{M-1} q_m D_m^2}{\sum_{m=0}^{M-1} q_m A_m^2}} = \sqrt{\frac{1}{M}\sum_{m=0}^{M-1} EVM_m^2}.$$

13. The method of claim 12, wherein the EVM distribution among constituent signals is equal, and wherein $$EVM_m = EVM_{rms} \Rightarrow D_m = EVM_{rms} \cdot A_m.$$

14. The method of claim 11, wherein the constituent signals have equal power spectral density (PSD), $A_0 = A_1 = \ldots$ the aggregate signal EVM, denoted $EVM_{rms}$, is $$EVM_{rms} = \sqrt{\frac{\sum_{m=0}^{M-1} q_m D_m^2}{\sum_{m=0}^{M-1} q_m A_m^2}} = \sqrt{\frac{\sum_{m=0}^{M-1} q_m D_m^2}{A^2 \sum_{m=0}^{M-1} q_m}} = \sqrt{\frac{\sum_{m=0}^{M-1} q_m EVM_m^2}{K}}.$$

15. The method of claim 14, where EVM is distributed evenly among constituent signals, the aggregate signal EVM, denoted $EVM_{rms}$, is $$EVM_m = \frac{EVM_{rms}}{\sqrt{\frac{1}{K}\sum_{m=0}^{M-1} q_m}} = EVM_{rms} \Rightarrow D_m = EVM_{rms} \cdot A_m.$$

16. The method of claim 11, wherein the constituent signals are orthogonal frequency division multiplexed (OFDM) signals and wherein the EVM is assigned at a subcarrier level by setting $D_k = EVM_k \cdot A_k$.

17. A transmitter operative to transmit an aggregate wireless communication signal comprising a plurality of constituent signals, each modulated onto a carrier, the transmitter comprising:
 a plurality of sampling modules, each operative to upsample a constituent signal to a common sampling rate;
 a combining module operative to combine the constituent signals into the aggregate signal; and
 an adaptive tone injection module operative to adaptively allocate groups of correction tones to each constituent signal in response to an error vector magnitude (EVM limit associated with the respective signal, and further operative to inject the correction tones into the aggregate signal so as to reduce the peak to average power ratio (PAPR of the aggregate signal while complying with the EVM limits of the constituent signals.

18. The transmitter of claim 17, wherein the adaptive tone injection module is operative to allocate groups of correction tones to each constituent signal by:
 specifying the maximum EVM of the constituent signals having an EVM limit;
 specifying the desired maximum amplitude of the aggregate signal;
 calculating the amplitude of the correction tones for each constituent signal having an EVM limit; and
 calculating the amplitude of the correction tones for each constituent signal without an EVM limit.

19. The transmitter of claim 17, wherein the adaptive tone injection module is operative to allocate groups of correction tones to each constituent signal by:
 specifying the weights for EVM of the constituent signals;
 specifying the desired maximum amplitude of the aggregate signal; and
 calculating the amplitude of the all correction tones for the constituent signals.

20. The transmitter of claim 17, wherein the adaptive tone injection module is operative to allocate groups of correction tones to each constituent signal by:
 assigning weights for EVM of the constituent signals;
 specifying the desired maximum amplitude of the aggregate signal;
 specifying the maximum EVM of all constituent signals; and
 setting the amplitudes of the correction tones for each constituent signal so that the EVM for each constituent signal is equal to the corresponding maximum EVM for that signal.

21. The transmitter of claim 17, wherein the adaptive tone injection module is further operative to allocate higher amplitude correction tones to a carrier having a higher EVM limit.

22. The transmitter of claim 17, wherein the adaptive tone injection module is further operative to allocate correction tones having higher aggregate power to a carrier having a higher average power.

23. The transmitter of claim 17, wherein the constituent signals conform to two or more radio access technologies.

24. The transmitter of claim 17, wherein the constituent signals are modulated onto different carriers in the same radio access technology.

25. The transmitter of claim 17, wherein two or more constituent carriers are orthogonal frequency division multiplexed (OFDM), and wherein the adaptive tone injection module is further operative to allocate correction tones such that subcarriers with higher tolerance for EVM exhibit a higher EVM.

26. The transmitter of claim 25, wherein subcarriers with higher tolerance for EVM comprise subcarriers with a lower modulation constellation size.

* * * * *

UNITED STATES PATENT AND TRADEMARK OFFICE
CERTIFICATE OF CORRECTION

PATENT NO. : 8,885,764 B2
APPLICATION NO. : 13/501333
DATED : November 11, 2014
INVENTOR(S) : Baldemair et al.

It is certified that error appears in the above-identified patent and that said Letters Patent is hereby corrected as shown below:

In the Specification

In Column 4, Line 60, delete "signal $(EVM_1^{(limit)})$" and insert -- signal $(EVM_1^{(limit)}$ --, therefor.

In Column 6, Lines 18-22, in Equation (6), delete $$EVM_{rms} = \sqrt{\frac{\sum_{m=0}^{M-1} q_m D_m^2}{\sum_{m=0}^{M-1} q_m A_m^2}} = \sqrt{\frac{\sum_{m=0}^{M-1} q_m D^2}{A^2 \sum_{m=0}^{M-1} q_m}} = \sqrt{\frac{\sum_{m=0}^{M-1} q_m EVM_m^2}{K}}$$

" and insert $$EVM_{rms} = \sqrt{\frac{\sum_{m=0}^{M-1} q_m D_m^2}{\sum_{m=0}^{M-1} q_m A_m^2}} = \sqrt{\frac{\sum_{m=0}^{M-1} q_m D_m^2}{A^2 \sum_{m=0}^{M-1} q_m}} = \sqrt{\frac{\sum_{m=0}^{M-1} q_m EVM_m^2}{K}}$$

--, therefor.

In the Claims

In Column 8, Line 14, in Claim 3, delete "the all" and insert -- the --, therefor.

In Column 9, Line 23, in Claim 15, delete "where EVM" and insert -- wherein the EVM --, therefor.

In Column 9, Line 48, in Claim 17, delete "(EVM" and insert -- (EVM) --, therefor.

Signed and Sealed this
Twenty-third Day of June, 2015

Michelle K. Lee
*Director of the United States Patent and Trademark Office*

CERTIFICATE OF CORRECTION (continued)
U.S. Pat. No. 8,885,764 B2

In Column 9, Line 52, in Claim 17, delete "(PAPR" and insert -- (PAPR) --, therefor.

In Column 10, Line 17, in Claim 19, delete "the all" and insert -- the --, therefor.